L. E. OAKES.
HARROW.
APPLICATION FILED DEC. 26, 1917.

1,313,008.

Patented Aug. 12, 1919.

WITNESSES:

INVENTOR
L. E. Oakes
BY H. J. Sanders
ATTORNEY

UNITED STATES PATENT OFFICE.

LARS ERIK OAKES, OF ELK POINT, SOUTH DAKOTA.

HARROW.

1,313,008. Specification of Letters Patent. Patented Aug. 12, 1919.

Application filed December 26, 1917. Serial No. 208,905.

*To all whom it may concern:*

Be it known that I, LARS ERIK OAKES, a citizen of the United States, residing at Elk Point, in the county of Union and State of South Dakota, have invented certain new and useful Improvements in Harrows, of which the following is a specification.

This invention relates to improvements in harrows and its object is to provide a harrow having a frame formed of a plurality of separable sections so that the size of the harrow may be readily increased or diminished as may be desired. A further object is to provide a harrow having a plurality of driving rollers and a plurality of driven rollers which, through connection with the driving rollers, are adapted to rotate at greater speed than the driving rollers to thoroughly break and pulverize the ground being worked.

With the foregoing and other objects in view the invention consists in the combination and arrangement of parts to be hereinafter fully described, pointed out in the appended claim and illustrated in the accompanying drawings which form a part of this specification and in which—

Like reference characters denote corresponding parts.

Figure 1:
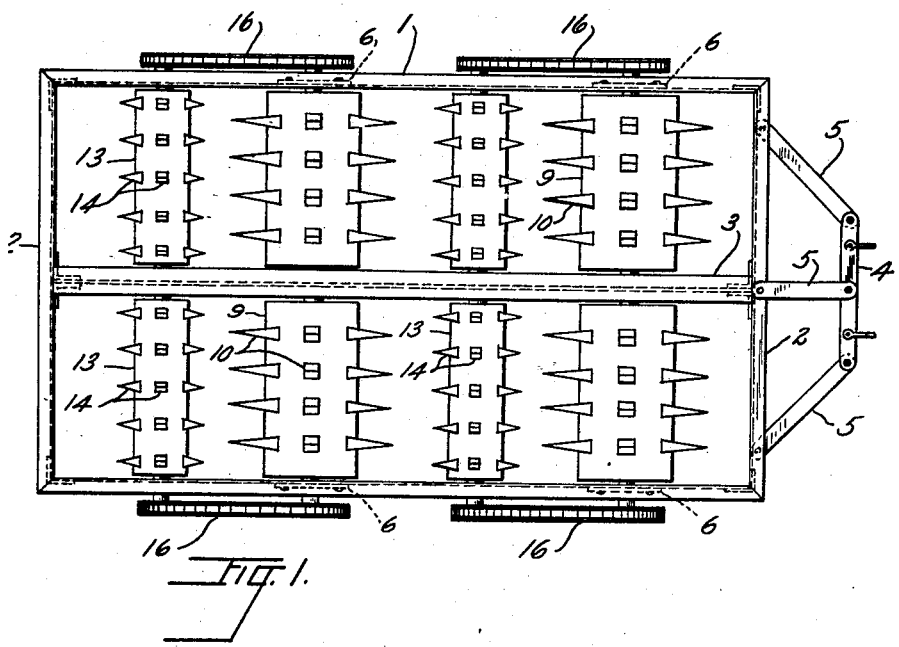
Figure 1 is a top plan view of my improved harrow.
Figure 2:
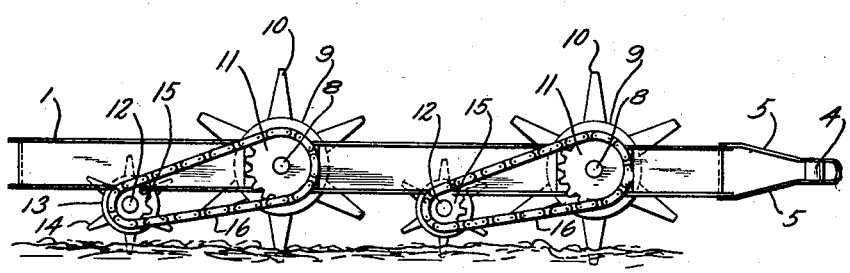
Fig. 2 is a view of the same in side elevation.

The frame of my improved harrow is formed of side angle bars 1, end angle bars 2 and a longitudinally extending centrally disposed angle bar 3. A draft bar 4 is connected by links 5 to the front end angle bar 2. In suitable bearings 6 secured to the side bars 1 the shafts 8 of the drive rolls 9 are journaled, said rolls being provided with the usual harrow teeth 10 and the said shafts 8 being projected beyond the frame bars 1 and provided with the drive gears 11. Shafts 12 also carried by the side bars 1 and central bar 3 carry the driven rolls 13 provided with the harrow teeth 14, said shafts 12 being projected beyond the bars 1 and provided with the gears 15 which are connected by the sprocket chains 16 with the said drive gears 11.

As the frame is moved over the ground the teeth 10 and 14 cultivate the soil. The drive gears 11 are of greater diameter than the gears 15 to which they are connected and consequently the gears 15 and shafts 12 are driven at a relatively great speed causing the teeth 14 to finely cut and pulverize the earth after it has been broken by the teeth 10 of rolls 9. Two or more of my harrow units may be yoked together in a well known manner when it is desired to cultivate a relatively great area in the minimum time.

What is claimed is:—

A harrow comprising a frame composed of side bars, end bars connecting said side bars, a longitudinal bar centrally of the frame and connected between said end bars, a plurality of pairs of independent harrow and clod-breaking rolls mounted at both sides of the frame between said side and central longitudinal bars, said harrow rolls being of greater diameter than said clod-breaking rolls and having rows of spaced teeth thereon, said clod-breaking rolls also having rows of spaced teeth arranged offset with respect to the teeth on said harrow rolls, shafts carrying said rolls and journaled in said side and central bars, the shafts projecting at both sides through said side bars, sprockets fixed on the projecting ends of said shafts, and chains passing about said sprockets, the sprockets on said harrow roll shafts being larger than the sprockets on the clod-breaking roll shafts whereby to drive the latter in the same direction and at a greater speed than the former.

In testimony that I claim the foregoing as my own I have hereto affixed my signature in the presence of two subscribing witnesses.

LARS ERIK OAKES.

Witnesses:
G. W. FREEMAN,
M. E. JOHNSON.

Copies of this patent may be obtained for five cents each, by addressing the "Commissioner of Patents, Washington, D. C."